United States Patent [19]

Reuter et al.

[11] 4,051,094

[45] Sept. 27, 1977

[54] ELECTRICAL CONDUCTIVE LACQUER

[75] Inventors: Franz Gottfried Reuter; Tankred Menzel, both of Lemfoerde, Germany

[73] Assignee: Reuter Maschinen et al, Lemforde, Germany

[21] Appl. No.: 621,767

[22] Filed: Oct. 9, 1975

Related U.S. Application Data

[60] Continuation of Ser. No. 504,192, Sept. 9, 1974, which is a division of Ser. No. 292,321, Sept. 26, 1972, abandoned.

[30] Foreign Application Priority Data

| | | |
|---|---|---|
| Sept. 27, 1971 | Germany | 2148191 |
| Oct. 16, 1971 | Germany | 2151626 |
| July 12, 1972 | Germany | 2234216 |

[51] Int. Cl.[2] ............ C08L 31/04

[52] U.S. Cl. ............ 260/29.6 M; 106/308 M; 252/511; 252/514; 260/29.6 S; 260/29.6 F; 260/42.55

[58] Field of Search ............ 260/29.6 S, 29.6 F, 260/29.6 M, 42.55; 106/308 M; 252/511, 514

[56] References Cited

U.S. PATENT DOCUMENTS

| | | | |
|---|---|---|---|
| 2,710,266 | 6/1955 | Hochberg | 260/29.6 F |
| 3,238,159 | 3/1966 | Di Benedetti et al. | 260/29.6 S |
| 3,450,661 | 6/1969 | Neel et al. | 260/29.6 S |
| 3,725,308 | 4/1973 | Ostolski | 252/514 |

FOREIGN PATENT DOCUMENTS

| | | | |
|---|---|---|---|
| 669,256 | 8/1963 | Canada | 260/29.6 F |

*Primary Examiner*—M. J. Welsh
*Attorney, Agent, or Firm*—Stevens, Davis, Miller & Mosher

[57] ABSTRACT

An electrically conductive lacquer adapted for use in heating elements is prepared by dispersing electrically conductive particles in an aqueous plastic dispersion in an aqueous silicate solution. Sodium or potassium silicate and an acrylic resin may be used in making the dispersion. The electrically conductive particles may be carbon or particles having a noble metal surface.

2 Claims, 9 Drawing Figures

ELECTRICAL CONDUCTIVE LACQUER

Figure 1A:
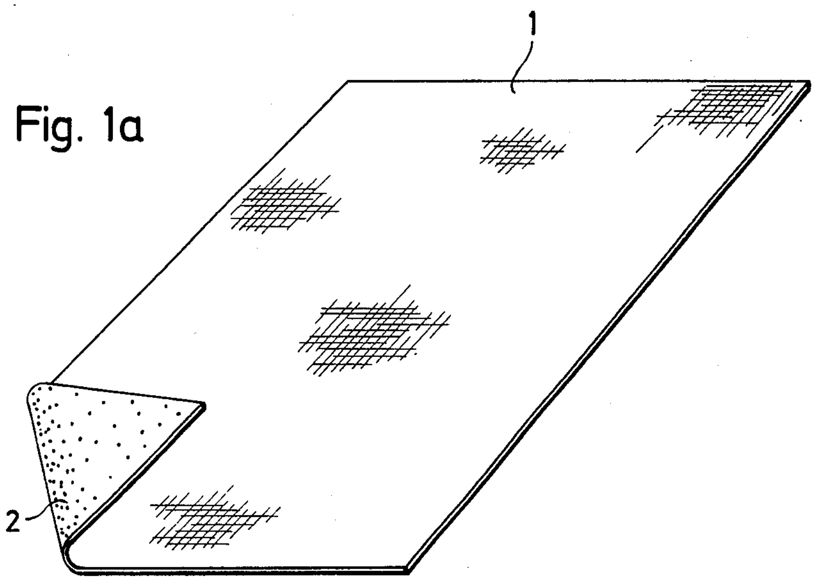

This application is a continuation of application Ser. No. 504,192 filed Sept. 9, 1974 which application is a division of application Ser. No. 292,321 filed Sept. 26, 1972, now abandoned.

The invention relates to conductive lacquers and to flexible and/or rigid electric area heating elements which, either by virtue of their elastic and flexible properties are intended particularly for pliable electrical heating appliances, e.g., electric cushions, or, by virtue of their outstanding mechanical properties, can be used, for example, as wall, floor and ceiling heating systems or for heating boxshaped structures or pipes.

In the case of conventionally used electric heat generators electrical energy is converted by so-called resistance wires, following Joule's laws into current heat, the heat produced being passed from the resistance wire through an insulation to the actual heat-irradiating effective surface. These heat conductor wires, which consist, for example, of nickelin or rheotan and constantan wire, easily break under mechanical strain, by virtue of fatigue phenomena. The disadvantages connected therewith are obvious. It will be understood that pliant heat generators constructed according to this system are sensitive to any kind of mechanical strain and ought not to be described either as pliable, flexible or elastic. For pliable electrical heating appliances, the VDE recommend imprinting the words "do not crease". In general technology, in the household and in medicine, however, elastic, flexible heat generators are desirable, e.g. if complicated contours have to be heated or if compression-bending deflections are required, such as is desirable for example in the case of a heating cushion pad which adapts to the contours of the body. Therefore, there have been various attempts to replace the resistance wires by another material which has substantially better mechanical stability.

Thus it is known to impregnate a flexible carrier material with conductive graphite and for the resultant heating element to be used for heatable bed covers and the like. The carrier material may be inorganic fibre material (British Pat. No. 747,257), organic fabric, for example cotton (U.S. Pat. No. 2,255,376), rubber (German Pat. No. 625,773) or even plastics material (British Pat. No. 671,881).

Where these known heating elements are concerned, the danger of conductor breakage is eliminated above all in the case of organic carriers. Despite this preference, they have not however become established in practice. The reason for this probably resides in the fact that the carrier materials as well as the conductive substances, do not withstand the desired mechanical stresses as soon as traction or compressive forces come into action.

Also known are for example flexible heating elements made from textile fabric, which obtain their conductivity by being coated or impregnated with a graphite dispersion. The term textile fabric in this case denotes a mechanical combination of weft and warp threads. The graphite coating applied to the textile threads by means of a dispersion lies on the weft and warp threads and joins them. This combination is neither flexible nor elastic, so that a slight tractive loading on a single warp or weft thread causes the graphite coating to tear, even if additional binders such as synthetic resins, are intended to enhance the adhesion. If this conductive fabric is then lined with an electrically insulating cover foil, or is otherwise mechanically loaded, then by virtue of the thread movements, the electrical values change to values which cannot be reproduced.

Also known are rigid, electrically heatable area heating elements which are produced by using wires or other woven tissues which are rendered electrically conductive. By virtue of production problems and the fact that the heat irradiation does not correspond to the desired requirements, it has not so far been possible for these area heating elements to become broadly established.

For numerous applications of per se rigid heating elements finally, it is desirable to use a mechanically readily deformable material for the heat-irradiation coating. Such a material is for example advantageous if three-dimensional box-shaped structures or half-shells of tubes have to be heated or are to be constructed as heating elements. Laminated materials would need to be glued if box structures are produced and, furthermore, they have a not completely satisfactory mechanical stressability and resistance to ageing.

The object of the invention therefore was to provide flexible and/or rigid area heating elements which do not exhibit the disadvantages of the prior art and which in particular have a high mechanical and electrical stability as well as reproducable electrical values and improved properties during the heating process. A further object of the invention was to provide a per se rigid area heating element in which the heat transmitting coating consists of a mechanically readily workable, mechanically heavily stressable, highly abrasion-resistant and ageing resistant material and which furthermore conveys heat particularly well and irradiates it to the ambient.

The problem according to the invention is resolved in that an electrically conductive film provided with appropriate electrodes and electrical connections and covered with a relatively thick heat-insulating coating, is applied either onto a unilaterally lined woven fabric or onto a thin heatresistant rigid heat-irradiating layer.

The object of the invention is thus an electrically heatable area heating element, which consists of a. either a unilaterally lined woven fabric or a thin heatresistant rigid heat irradiating layer;

b. an electrically conductive film applied to the non-lined side of the woven fabric or to one side of the rigid coating or layer and which is provided with corresponding electrodes and electrical connections, and c. a thicker heat-insulating coating, preferably a plastics coating, which is applied over the electrically conductive film.

The electrically conductive film hereinafter referred to as the "heating film", of the area heating elements according to the invention is preferably such a film as has been obtained by applying a plastics dispersion which contains electrically conductive particles. The term electrically conductive particles relates thereby preferably to rare metals, other metals or substances coated with rare metal, or carbon, e.g. soot or graphite; soot is particularly preferred. Particularly preferred is an acetylene soot such as is available for example in the form of an aqueous dispersion.

According to a particular form of embodiment of the area heating element according to the invention, the thin, heatresistant, rigid, heat-irradiating layer consists of a metal layer, while the side of the metal layer which is towards the electrically conductive film has an electrical insulating layer or coating.

For the further construction of a heating element according to the invention, at least two electrodes are also required. The purpose of the electrodes is to establish a resistance value between the electrodes which is regular over the entire conductive area. When an electric voltage is applied to the electrodes, then by virtue of the film resistance an homogenous voltage potential forms between the electrodes. The electrodes may be made from flexible metal strip or for example copper-lined plastics foil, so long as the electrodes are not mechanically stressed.

For flexible heating elements such as heatable car seats, heated cushions, heated blankets and the like, a flexible and to a certain extent elastic electrode is required because the heating elements are loaded over their entire area with compression and bending deflections.

In addition to fulfilling these mechanical requirements, the electrodes in both flexible and also rigid area heating elements must have very good electrical conductivity which corresponds approximately to the metal conductors. According to the invention, it has been found that electrodes with elastic and readily conductive properties, such as are manufactured as described hereinafter, are particularly suitable for flexible area heating elements. As a conductive substance, it is not powder from solid silver but powder from silver-plated copper which is used. The powder is commercially available. The particle size is approximately 180 microns. Other metal powders, apart from those coated with rare metals, cannot be used for this purpose. In order to produce the electrodes, a powder of silver-plated copper with a particle diameter of approximately 180 microns, is stirred for example into a 50% aqueous acrylic resin dispersion. Sufficient powder is added for the mixture to be just brushable. Since the relatively large particles of metal powder exhibit, alongside the tangential contact points, relatively large interstices, a 25% aqueous soot dispersion is stirred into the existing mixture. The soot dispersion with 25% readily conductive acetylene soot content (23 millicrons particle diameter) fills the previously unfilled interstices completely with particles of soot once the film-forming carrier liquid has dried off. Thus, the interface resistance of the metal particles is considerably relieved. This is a parallel connection of individual resistances.

According to the thickness, these readily conductive films have a resistance of about 0.1 ohms/sq.cm. and, after a drying time of about 1 hour at room temperature, they exhibit a satisfactory flexible and elastic behaviour.

The thicker heat-insulating coating may consist of any desired homogenous or foamed plastics material which corresponds to the required demands. Preferably, the plastics coating is of polyurethane. In the case of flexible heating elements, this coating particularly consists of a softly elastic polyurethane foam which can be particularly easily foamed directly onto the layer of fabric, while in the case of rigid area heating elements, a layer of rigid polyurethane foam is preferred. The manufacture of the various types of polyurethane foam, soft and hard foams, is known to a man skilled in the art.

Figure 1B:
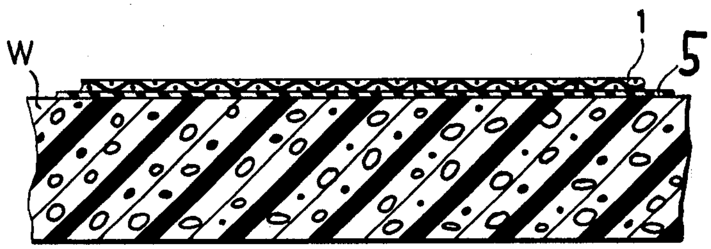
Figure 2:
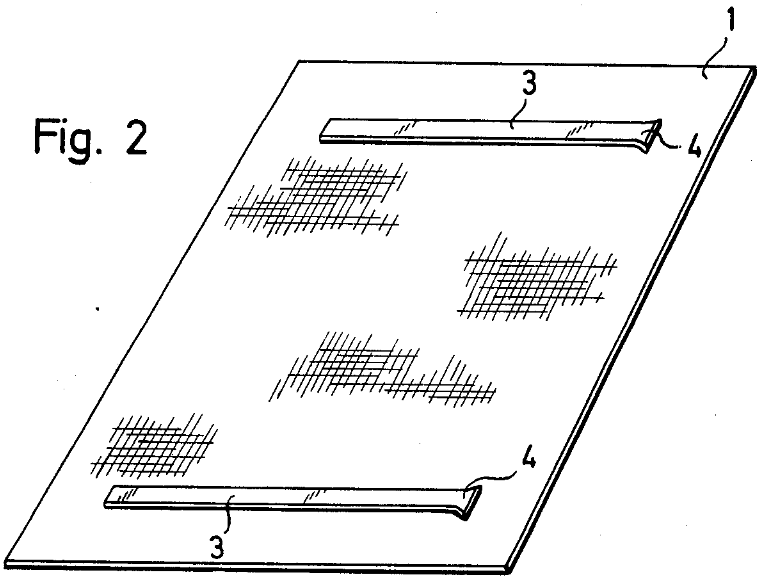
Figure 3:
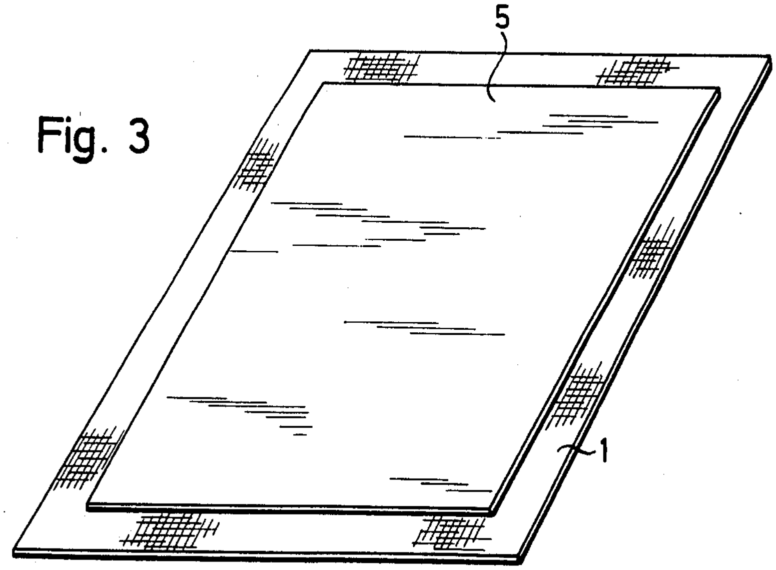
Figure 4:
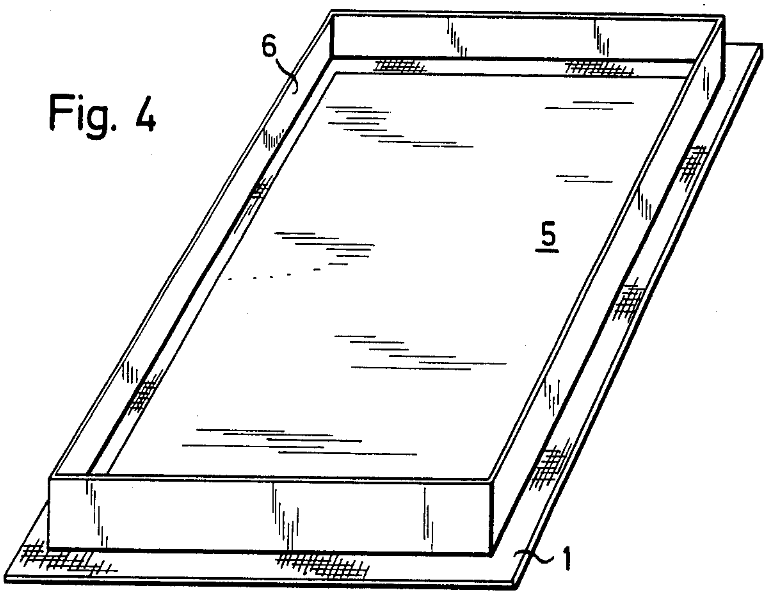
Figure 5:
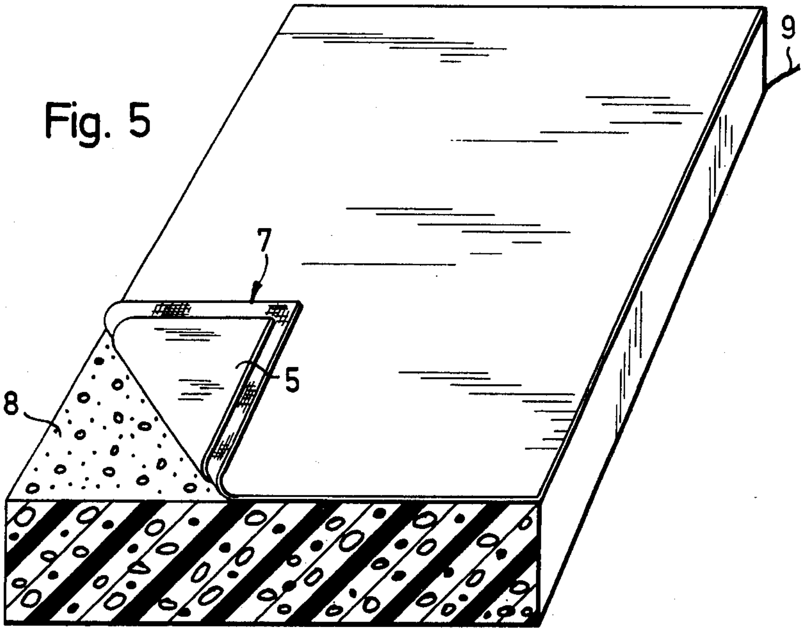
Figure 6:
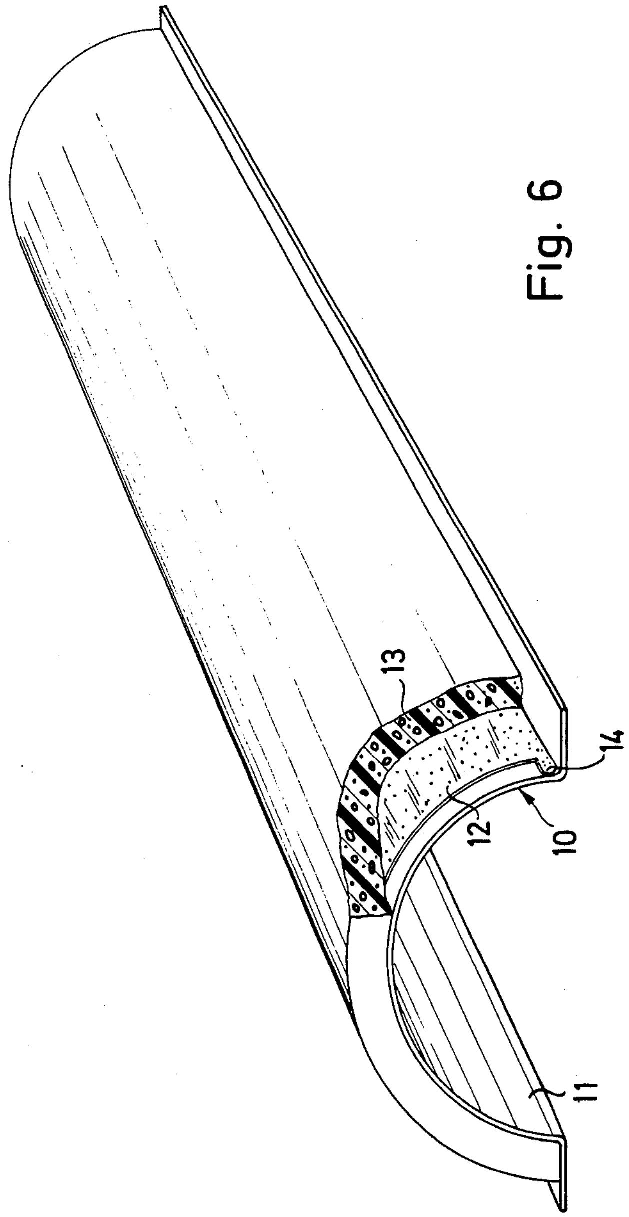
Figure 7A:
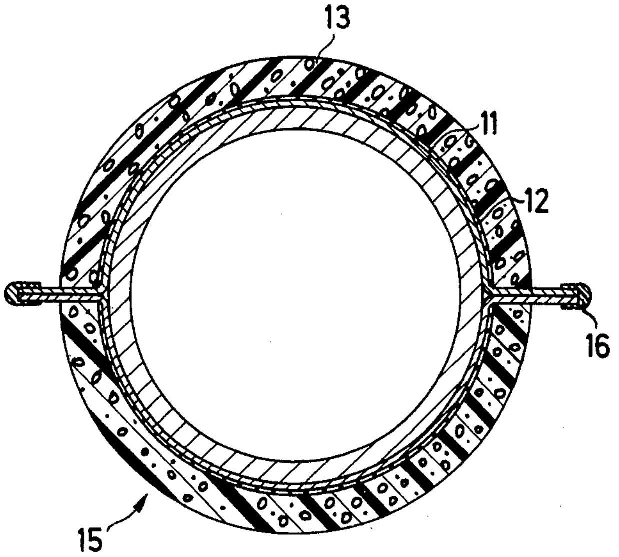
Figure 7B:
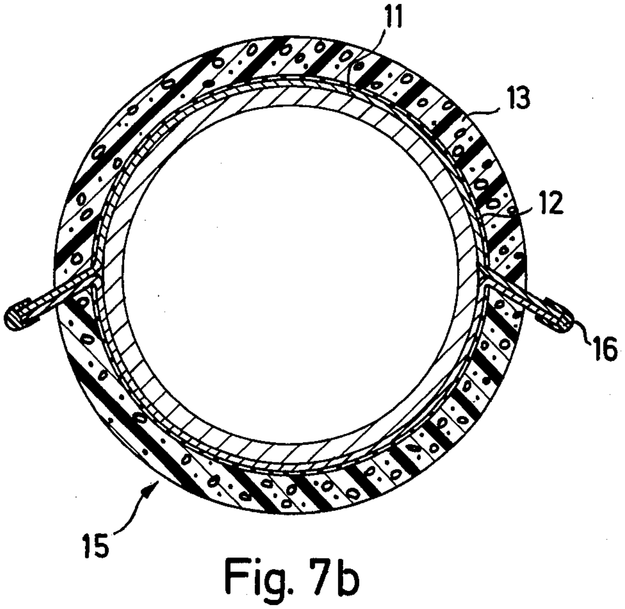

Further details of the electrically heatable area heating elements according to the invention will become manifest from the ensuing description, the examples of embodiment and the drawings, in which:

FIG. 1*a* shows a thin heat-irradiating layer 1 in form of a woven fabric, e.g. a textile fabric, line on one side, consisting of the fabric and the plastics lining 2;

FIG. 1*b* shows a cross-section through a rigid area heating element according to the invention, consisting of a thin heat-irradiating layer 1, the heating film 5 and the thick heat-insulating layer W;

FIG. 2 shows a thin heat-irradiating layer 1 (in the case of a flexible heating element a lined fabric) provided with (in the case of a flexible area heating element elastic) electrodes 3 and connection points 4;

FIG. 3 shows the same object as in FIG. 2, but with a subsequently applied heating film 5;

FIG. 4 shows the thin heat-irradiating layer 1 (or unilaterally lined fabric) provided with the heating film 5, together with a frame 6 for producing a layer of foam material;

FIG. 5 shows an area heating element according to the invention, consisting of the woven fabric 7 line on one side and treated with the plastics dispersion containing the electrically conductive particles (or having the heating film 5), and the foam padding 8 and connecting lead 9;

FIG. 6 is a perspective view of an area heating element 10 according to the invention, in the form of a half-tube shell, the heat-irradiating layer being a metal layer, 11 being the sheet metal cover, 12 the sprayed-on heating film, 13 a rigid plastics foam layer and 14 an electrical connection; and FIG. 7*a* and 7*b* show a cross-section through a pipeline 15 having a heating shell 11 which has been formed from two tubular half-shells of the type shown in FIG. 6; 16 being packing strips.

Hereinafter, the flexible embodiment of the area heating element according to the invention will first be described in greater detail.

The fact that the woven fabric used in flexible area heating elements is lined on one side means that the freedom of movement of the individual threads which occurs in conventional area heating elements which have a disadvantage effect for the reasons already stated, is restricted.

For the purpose of the invention, it is possible in principle to use any woven fabrics which are lined on one side, the woven fabric consisting of organic or inorganic materials. Preferably, however, absorbent woven fabrics are used, since when these woven fabrics are treated with the hereinafter described aqueous dispersion, a better adhesion of the heating film which is to be formed can be achieved. The use of non-absorbent woven fabrics is naturally also possible, namely if the heating films which are to be applied adhere sufficiently to the woven fabric. As a textile fabric, it is possible to use fabrics made from natural as well as from synthetic fibres. With regard to the lining, according to the invention, it is particularly those unilaterally lined fabrics wherein the plastics coating is approximately 100 g/sq.m which have proved particularly suitable. According to the invention, particular preference is given to those textile fabrics which are lined on one side with flexible plastics material, for example those which are available commercially under the trade names Vistram Knautschlack. Naturally, when using line fabrics of woven type, it is possible also to produce rigid heating elements, e.g. wall or ceiling heating systems, when for example a polyurethane rigid foam can be applied to the unlined side of the fabric. For such purposes, the fabric will naturally also be lined with rigid plastics material.

For the manufacture of flexible and elastic wireless area heating elements according to the invention, particularly suitable plastics dispersions which are blended with the electrically conductive particles prior to application onto the woven fabric, are any plastics dispersions which form an elastic ageing resistant film. According to the invention, preferably a 60% aqueous dispersion of polyisobutene is used.

In order to produce the aqueous electrically conductive particle-containing plastics dispersion, an aqueous dispersion of polyisobutene is for example blended with an aqueous dispersion of soot, the viscosity of the plastics dispersion being so adjusted by the blending with the soot dispersion, that a readily brushable mixture is obtained. This mixture is then for example applied to the fabric side of the unilaterally lined textile fabric, i.e. onto the textile fabric which then rapidly absorbs the mixture which forms the film. The film forms within 30 minutes at room temperature. Then the film, according to the thickness of the applied coating, is artificially aged for a few hours at 80° C. The ageing is necessary to stabilise resistance, because the plastics particles previously present in the plastics dispersion, exhibit shrinking due to artificial ageing. The shrinking has the effect that the contact between the conductive particles adhering to the plastics particles becomes somewhat loosened, so that the electrical resistance of the film is somewhat increased. The dispersion forming the heating film consists preferably of an aqueous plastics dispersion which, by the admixture of an aqueous soot dispersion, is adjusted to the desired values with respect to conductivity and workability. A completed foil with the heating, film applied to the reverse side is flexible and exhibits its surprisingly good elastic properties.

In the case of rigid area heating elements with a thin heat-transmitting layer, the thin layer 1 (FIGS. 1*b* and 2) may be any flat preferably rigid heat resistant material possibly provided with special designs on the heat-irradiating side. In order to avoid the heating film being affected by outside influences, by atmospheric humidity, the thin layer 1 is preferably impervious to air. As an example for the thin layer 1, the boards available commercially under the trade mark Resopal should be mentioned. A preferreed method of producing a rigid area heating element according to the invention resides in that, in order to form the heating film, an aqueous plastics dispersion containing the electrically conductive particles is applied onto the thin heat-irradiating layer, the plastics dispersion preferably containing as plastics material an acrylic resin and as electrically conductive particles soot and additionally a potassium or sodium silicate, and after drying of the film, preferably at a temperature of approximately 90° C and with a drying time of approximately 30 minutes, and the application of electrodes and corresponding electrical connections, the thicker heat-insulating coating is applied, preferably a coating of rigid polyurethane foam, whereby, in the case of a rigid polyurethane foam coating, the foam-forming reaction mixture is brought directly into contact with the previously applied heating film.

The viscosity of the plastics dispersion which can be obtained by blending an aqueous acrylic resin dispersion with an aqueous potassium or sodium silicate solution and an aqueous soot dispersion, is expediently so adjusted that a readily brushable mixture is obtained. This mixture is then for example applied to the non-designed side of a Resopal panel.

The use of alkali silicates for such electro-technological uses was not hitherto conventional, because potassium or sodium silicate solutions are not water-resistant and could therefore be destroyed even by atmospheric humidity. Only by virtue of the foaming of the air-impervious rigid polyurethane foams and the use of an air-impervious front panel, according to the invention, has it become possible and expedient to use silicate film. For example, heating films without silicates are subject to marked attack from the rigid foam-forming starting components of the polyurethane, so that the resistance value upon foaming undergoes a 50% change.

The acrylic resin dispersion additionally stirred into the silicate solution and which, exactly like the silicates solution, serves to bond the electrically conductive particles, imparts a certain elasticity to the film. This elasticity is desired because, during heating up within 10 seconds from 20° to 100° C, substantial differences in temperature and mechanical stresses occur in the system.

It has been demonstrated that a silicate-polymer system is particularly suitable for absorbing such jumps in temperature so that particularly the conductivity of the heating film is at the moment of starting very favourably influenced. The film of silicate-polymer-soot mixtures is resistant to the aggressive starting components for forming the rigid polyurethane foam, since the foam components are shot directly onto the heating film. The residual humidity on the film (due to polar surfaces) is absorbed by the foam components which contain isocyanate.

In addition to ageing-resistant acrylic resin dispersions, polytetrafluoroethylenes are also very suitable as a synthetic plastic dispersion.

If rigid area heating elements according to the invention are used for floor heating then prefereably before or after they are laid on the floor, the thicker heat-insulating layer actually lying on the floor, they are provided on the thinner heat-irradiating layer, with a coating of floor-finish which is designed as a heat storage means.

The area heating elements according to the invention, which are preferably lined on the back with a coating of polyurethane foam, are universally usable. In addition to their ready workability into soft and rigid foams, polyurethane materials are particularly characterised by excellent thermal insulating properties. The heating elements according to the invention particularly exhibit three advantages:

1. The heat generated is given off only through the effective area, so that minimal conduction losses result.

2. By virtue of the low heat losses and the construction of the heating area, the heating-up times are very short even in the case of heating elements measuring several square meters in size.

3. By virtue of the fact that the polyurethane reverse side can be soft, springingly elastic or rigid, the construction of heatable padding elements and wall and large-area heating systems is possible in just one operation.

The weight of a one square meter large and 20 mm thick heating area with a coating of polyurethane foam is approximately 1000 g. The heat-irradiating side consists of a material which can be supplied in the most widely diverse designs. In oder to eliminate risks caused for example by knocking nails into the heating area, these heating elements preferably operate on low voltages. According to the field of application, so the heating elements are adjusted to the most widely diverse temperature ranges and can be designed for any working voltages.

If by virtue of poor heat dissipation, an upper temperature limit has to be provided, then a "cold conductor" or some other temperature limiting means can be connected directly in or on the heating film circuit.

For heating elements according to the invention, with low working voltages, only the heat-film-forming mixture has to be somewhat modified in that the resistance is reduced according to the desired values by the addition of silver-coated metal powder.

If the heat-irradiating layer of the heating element according to the invention is a metal layer, then it can consist of all manner of metal plates, including galvanised or anodised plates, the metal plates being of any desired thickness.

The electrical insulating layer which in this case is found on that side of the metal coating which is towards the heating film should adhere very rigidly to the metal layer and exhibit a satisfactory bond with the heating film. Furthermore, the insulating layer must consist of a material with a high electrical insulating capacity and a high breakdown voltage.

Preferably, the insulating coating consists of a material resistant to temperatures up to 150° C, particularly a plastics material which does not soften under the effect of heat or which has no other disadvantageous rheological properties, and which does not develop any gases, and which is expediently present in the hardened-out state. Mostly preferred among plastics materials are epoxide resins which have been applied by some powder technology.

Particularly suitable as epoxide resin powders are singlecomponent resins marketed by the 3M Company under the trade names "Scotchkote" and "Resistan". Metal plates coated with epoxide resin can be bent in this state, so that the coating suffers no damage.

Preferably the insulating coating has all over a minimum thickness of approximately 70 $\mu$.

The insulating coating may also be a layer of lacquer or a plastics foil lined onto the metal plate. In the latter case, however, the cut edges are not coated and thus constitute a corrosion problem, whereas in the case of plates coated with powdered epoxide resin, also the cut edges are coated.

A preferred form of embodiment of area heating element according to the invention and of the last-mentioned type takes the form of tubular half-shells which are suitable for the heating of tubes, particularly for maintaining the correct temperature conditions in pipelines. As a heat-insulating layer, these tubular half-shells preferably have a coating of rigid polyurethane foam which permits an almost 10% unilateral transmission of heat to the effective surface. The construction of the area heating element in the form of two separate tubular half-shells permits of easy assembly and removal of the heating system.

According to another modified form of embodiment, the area heating element according to the invention takes the form of a tube, the tube body taking over the role of the metal plate. In the case of this form of embodiment, the heating film is located directly on the tube body which is coated with epoxide resin powder.

The area heating elements according to the invention, which are present in the form of tubular half-shells or tubes are inter alia also suitable as accompanying heating for the transport of oil, and can also be used in chemical plant engineering.

The area heating element according to the invention is completely waterproof and resistant to temperatures down to below −60° C. The are heating element can furthermore be used for working temperatures of up to +90° C. It is mostly arranged for voltages of 12, 24, 42, 60 or 110 volts.

Metal area heating elements are preferably used only for voltages up to 110 volts, since, between the heating film and the plate with the dielectric located in between (electrical insulating coating), a capacitor system builds up which can under certain circumstances result in an electrical breakdown.

A modified area heating element according to the invention has instead of the thicker heat-insulating rigid coating, a thin heat-irradiating coating. This thin coating preferably consists of an epoxide resin. This form of embodiment is particularly applicable if the heat can be irradiated to the ambient on both sides.

Hereinafter, the manufacture of an area heating element according to the invention having a metal layer as a heat-irradiating layer will be explained with reference to an example.

A metal plate is cleaned and then coated on both sides with an epoxide resin powder. The coating can be applied for example by the eddy sinter method, at the spraying method or the electro-static coating process; preference is given to the latter process.

The coated plate is then heated in order to dry out the epoxide resin. Then, electrodes are applied to one side of the coated plate. For low working voltages, e.g. of 12 to 42 volts (current flow above 2 amperes), silver plated or gold-plated copper strips are glued directly onto the layer of epoxide resin. Glues are used which contain no acetone or methyl ethyl ketone. For lower currents, (current flow less than 2 amperes), the electrodes can be produced by application of liquid silver lacquer. The electrical resistance along an electrode ought not to exceed 1 ohm.

Once the electrodes have been applied, the heating film as previously described is applied and dried out at elevated temperature. The heating film ought to overlap both electrodes. Thereupon, the electrodes are connected to connecting wires by means of terminals or by soldering. Finally, the entire system is foamed with rigid polyurethane foam by one of the previously described methods.

If by virtue of some special application of the area heating element, no layer of foam is required, then the heating film, like the electrodes, can also be coated with epoxide resin, in which case an area heating element is obtained which as mentioned, has a thin heat-irradiating layer instead of the thicker heat insulating layer.

In any case, the heating film should be protected against atmospheric influences, for example because the formation of sweated water which occurs can result in creep currents.

The following examples explain the invention without however restricting its scope.

EXAMPLE 1

Manufacture of a Flexible Heating Cushion

A textile fabric (see FIG. 1*a*) lined on one side with plastics material is provided on the unlined side with flexible elastic electrodes (see FIG. 2). The electrodes are applied by means of a template (14 mm wide, 270 mm long) and are at a reciprocal distance of 370 mm. The electrode mixture consists of 80 parts by weight of a 50% dispersion of a copolymer of butyl acrylate, vinyl acetate and acrylic acid, 100 parts by weight of silver-coated copper powder and 100 parts by weight of a 25% acetylene soot dispersion.

Then, using a frame template (270 × 370 mm), the actual heating film is applied. In order to produce the heating film, an aqueous dispersion of polyisobutene is, while being stirred, thoroughly blended with a 25% aqueous acetylene soot dispersion. The easily brushable mixture is evenly applied to the woven fabric. The electrodes are completely covered by the heating film. Then, the film is dried. By means of plastics rivets, a contact plate and cable shoe are applied to each electrode in order to allow connection to a voltage supply.

The entire heating film can if necessary be sealed with an electrically insulated plastics dispersion.

The formation of a softly elastic polyurethane foam padding on the heating film is now prepared. The polyurethane foam is foamed on in known manner and therefore need not be described in greater detail. A mould frame, with for example sides 40 mm high, is so placed on the heating foil that on each side of the heating film, the inside of the mould frame is at a minimum distance of 15 mm (see FIG. 4). The reaction mixture forming the foam is poured into the mould space. A mould cover is placed on the mould and pressure applied in order to avoid emergence of the foaming substance.

The mould frame can be removed after 10 minutes. On its reverse side, the heating element now shows the elastic foam pad (see FIG. 5). When a voltage is applied, the heat generated is now radiated only from the lined surface.

EXAMPLE 2

Manufacture of a Resopal-coated Heating Element

A Resopal panel is first provided with electrodes on the side on which there is no design. The electrodes are applied by means of a template (14 mm wide, 270 mm long) and are at a reciprocal spacing of 370 mm. The electrode mixture consists of 80 parts by weight of a 50% dispersion of a copolymer of butyl acrylate, vinyl acetate and acrylic acid, 100 parts by weight of silver-coated copper powder and 100 parts by weight of a 25% acetylene soot dispersion.

Then, using a frame template, (270 × 370 mm), the actual heating film 5 is applied. In order to produce the heating film, to a mixture of 100 parts by weight of a potassium silicate solution (potassium water-glass, dry substance 30%, water 70%), with a $K_2O$ : $SiO_2$ ratio of 1 : 2.45 and 80 parts by weight of a 25% aqueous soot dispersion, are added 80 parts by weight of 50% aqueous acrylic resin dispersion. The readily brushable mixture is applied evenly to the non-designed side of the Resopal panel. The electrodes are completely covered by the heating film. The film is then dried for approximately 30 minutes at approximately 90° C. A contact plate and a cable shoe are attached to each electrode in order to allow connection to a voltage source.

The entire heating film may if necessary be sealed with an electrically insulating plastics dispersion.

The formation of a rigid polyurethane foam on the heating film is now prepared. The polyurethane foaming material is foamed on in known manner and need not therefore be described in greater detail. The mould frame with sides for example 40 mm high, is so placed on the heating foil that the inside of the mould frame is at a minimum distance of 15 mm from each side of the heating film. The reaction mixture forming the rigid foam is poured into the space in the mould. A cover is placed onto the mould and pressure is applied to it to avoid the foaming-up material emerging.

After removal of the mould frame the heating element has on its reverse side of a layer of rigid polyurethane foam. The heat generated when a voltage is applied is now irradiated from the surface of the Resopal panel.

It goes wihout saying that also the thicker, heat-insulating layer may first be produced, the conductive film and the electrodes etc. then applied after which the heat-irradiating thin layer can be applied. For example, it is possible first to produce a rigid polyurethane foam panel, provide this on one side with an electrically conductive film and the corresponding connections and then to foam on a thin coating of rigid polyurethane foam to act as a heat irradiating layer.

EXAMPLE 3

Manufacture of a Rigid Heating Element with a Metal Coating as a Heat-irradiating Layer An iron plate is cleaned with trichloroethylene and then coated by the electrostatic coating process. The powdered resin is applied in a quantity which is so calculated that the completed layer is approximately 100 microns thick. The coated plate is then heated in an oven to 200° C, the epoxide resin hardening to form an homogenous film.

Then, onto one side of the iron plate, directly onto the epoxide resin coating, silver or gold-plated copper strips are glued to act as electrodes. Then, the heating film is so applied that it overlaps both electrodes. The heating film is then dried for 15 minutes at 80° C.

After the connecting wires have been joined to the electrodes by terminals or by soldering, the entire system is foamed in with rigid polyurethane foam in the manner previously described.

EXAMPLE 4

Example 2 is repeated with the modification that the heating film and the electrodes are not foamed in but are likewise coated with epoxide resin. The resin is hardened out by being heated for 6 minutes to 150° C.

We claim:

1. An electrically conductive lacquer consisting essentially of silver-plated copper particles, acetylene soot particles, and a binder, the binder being an aqueous dispersion of a copolymer of butyl acrylate, vinyl acetate, and acrylic acid in an aqueous silicate solution.

2. Conductive lacquer according to claim 1, characterized by the fact that the silicate solution is a sodium or potassium silicate solution.

* * * * *